United States Patent [19]

Moore Jr.

[11] Patent Number: 4,865,132
[45] Date of Patent: Sep. 12, 1989

[54] TILLAGE IMPLEMENT HAVING INDEPENDENT DEPTH CONTROL MECHANISM

[75] Inventor: Fred P. Moore Jr., Selma, Ala.

[73] Assignee: Allied Products Corporation, Chicago, Ill.

[21] Appl. No.: 158,382

[22] Filed: Feb. 22, 1988

[51] Int. Cl.$^4$ .................. A01B 13/08; A01B 61/04; A01B 63/32

[52] U.S. Cl. .................. 172/196; 172/266; 172/488; 172/462; 172/140

[58] Field of Search ............ 172/497, 500, 501, 502, 172/484, 488, 470, 196, 146, 266, 264, 462; 111/66, 85, 62

[56] References Cited

U.S. PATENT DOCUMENTS

| | | | |
|---|---|---|---|
| 3,170,421 | 2/1965 | Norris | 172/146 X |
| 3,321,027 | 5/1967 | Johnson et al. | 172/266 |
| 3,398,707 | 8/1989 | McClenny | 111/85 |
| 4,055,126 | 10/1977 | Brown et al. | 172/146 |
| 4,102,404 | 7/1978 | Kammer | 172/266 |
| 4,187,916 | 2/1980 | Harden et al. | 172/146 |
| 4,213,408 | 7/1980 | West | 172/196 |
| 4,230,054 | 10/1980 | Hatcher | 111/85 |
| 4,285,284 | 9/1981 | Van der Lely | 172/47 |
| 4,506,609 | 3/1985 | Fuss | 111/85 |
| 4,524,837 | 6/1985 | Harden | 172/196 |
| 4,729,435 | 3/1988 | Urich | 172/196 |

OTHER PUBLICATIONS

"The Bush Hog Ro-Till" Booklet.
"Bush Hog Ro-Till Operator's Manual, 1986".

Primary Examiner—Richard J. Johnson
Attorney, Agent, or Firm—Lockwood, Alex, Fitzgibbon & Cummings

[57] ABSTRACT

A tillage implement is provided which is of the type that has a plurality of working components that perform a multiple number of different soil treatment operations during a single trip across an agricultural field. One of these working components is a deep tillage component having a high draft requirement. The depth of operation of this deep tillage component is controlled independently of the depth of the other working components which are not significantly disrupted when the depth of operation of the deep tillage component is modified, which modification can be easily and quickly made.

19 Claims, 4 Drawing Sheets

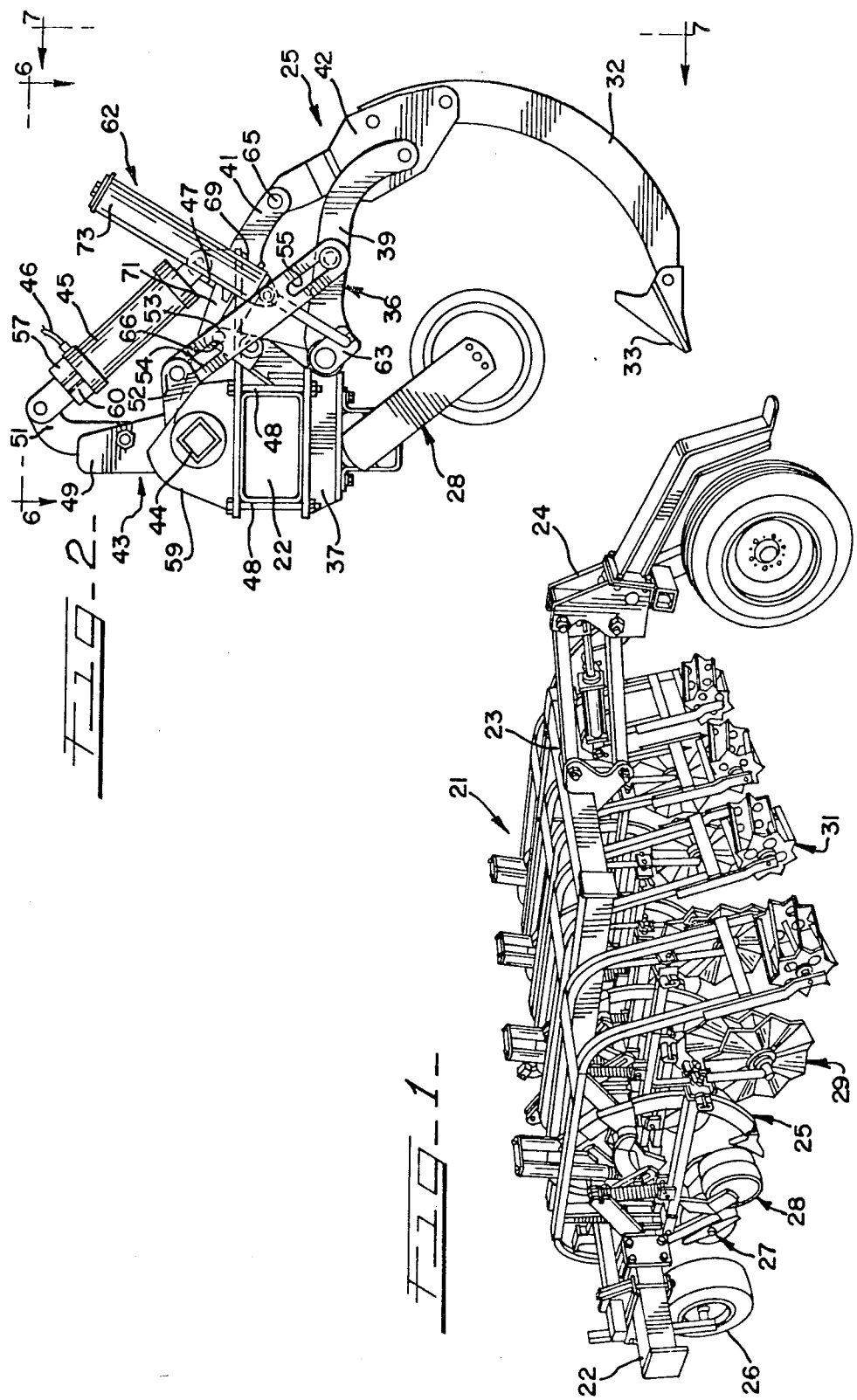

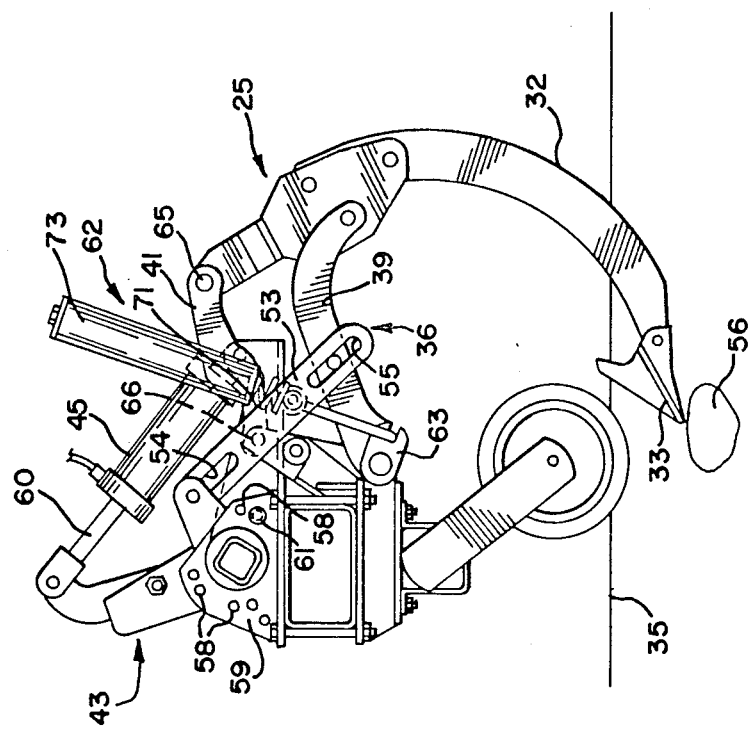

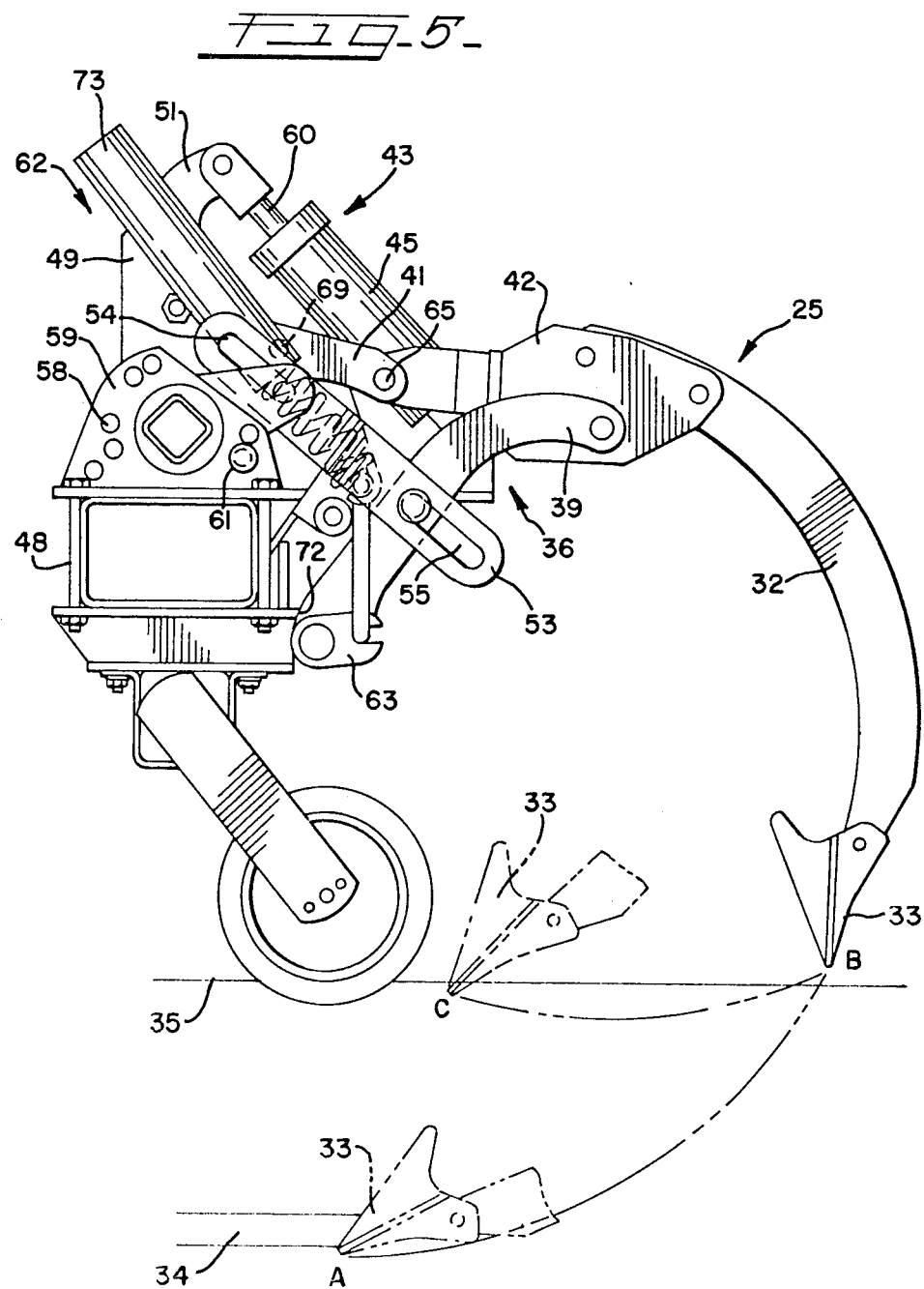

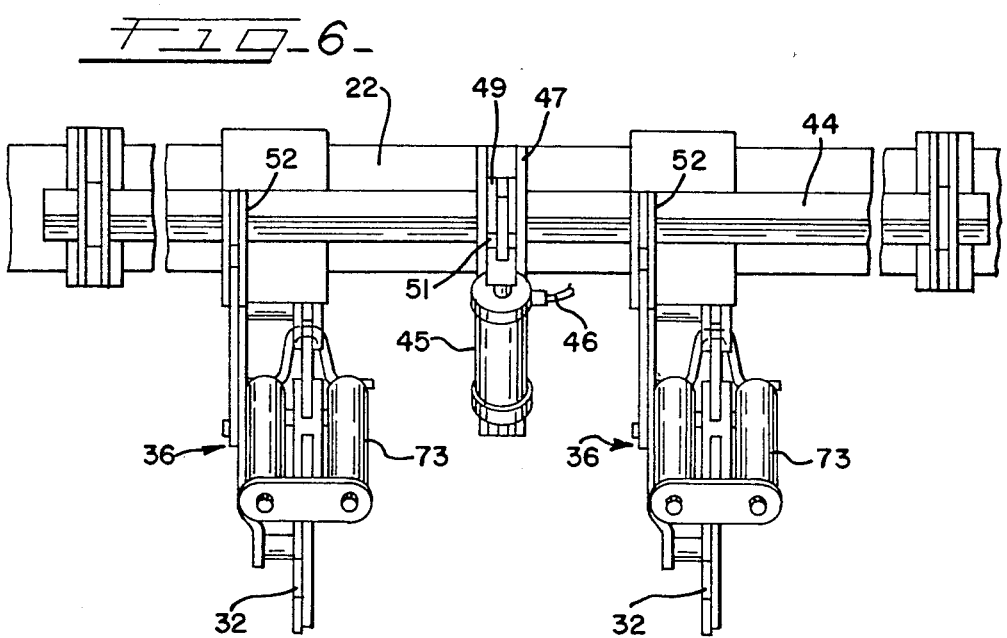
FIG-6-
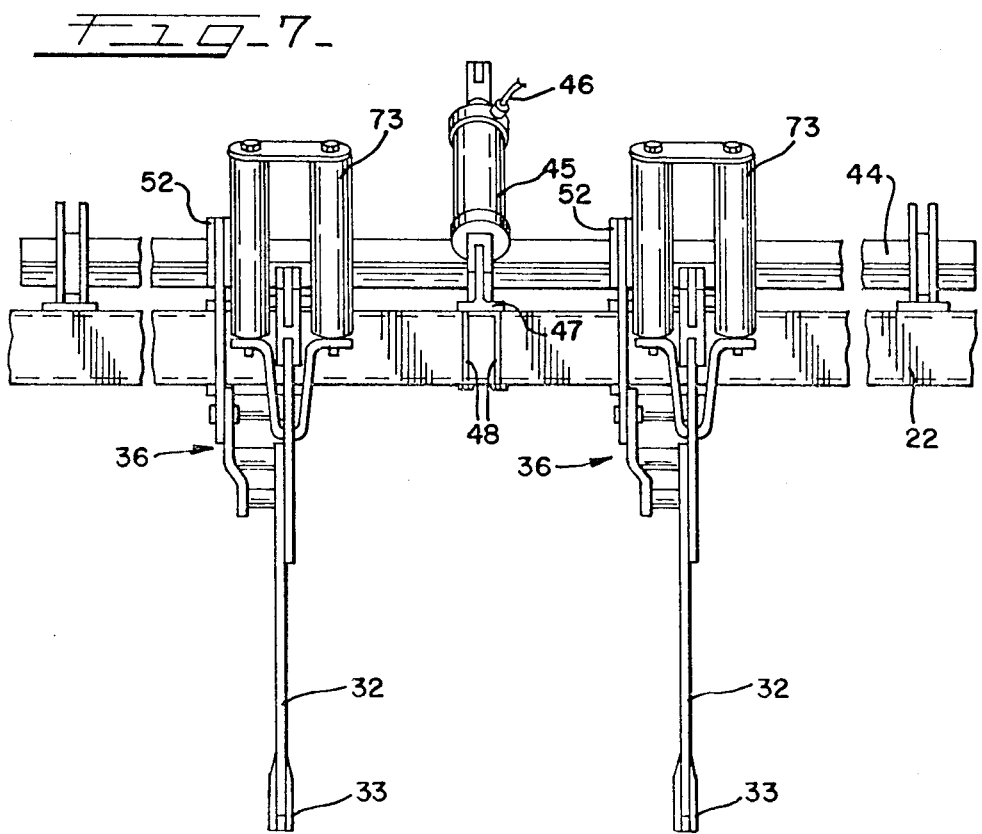
FIG-7-

TILLAGE IMPLEMENT HAVING INDEPENDENT DEPTH CONTROL MECHANISM

BACKGROUND AND DESCRIPTION OF THE INVENTION

The present invention generally relates to earth working or tillage implements that have a plurality of earth working tools and that have a mechanism for controlling the draft attributes of an earth working tool independently of other earth working tools of the tillage implement. More particularly, the invention relates to agricultural machinery of the type that has assemblies which perform a plurality of tillage operations during a single pass through the field being tilled and, when desired, planted. The machinery includes an assembly for varying the soil penetration depth of an earth working tool substantially independently of the depth or depths at which other earth working tools of the machine are operated, preferably while also permitting floating and/or tripping of the earth working tool when it engages a subterranean obstacle.

Agricultural machinery for performing tillage operations includes devices that perform multiple operations on the soil during a single pass of the machinery through a field being tilled and/or planted. The types of different operations in this regard include those that break the soil to predetermined depths, which can be subsoil depths, for working the so-called plow pan or compaction layer. Other operations performed by different tool components on this type of machinery include those which are more in the nature of surface soil conditioning and planting functions. Such surface soil conditioning tool components can take the form of devices for cutting through foliage, devices for breaking up earthen clods, devices for directing loosened soil into subsoil grooves, devices for pulverizing the soil and forming same into an acceptable seed bed, as well as devices for depositing seeds and the like into the prepared seed bed. Examples of machinery of this general type are illustrated in Brown et al U.S. Pat. No. 4,055,126 and Harden et al U.S. Pat. No. 4,187,916, the disclosures thereof being incorporated by reference hereinto.

Problems that have been encountered when using this type of machinery are generally caused by the very advantageous features that are provided by this type of machinery, namely the ability to generally simultaneously perform a plurality of earth working functions, and particularly functions that must be carried out at differing soil depths. More particularly, the operation of this type of machinery includes the need to adjust the respective depths at which each of the various components operate. These adjustments are made based upon what the farmer believes to be the soil conditions under which the machinery must operate. Typically, these adjustments are made before the tillage operation is begun or at times when the machinery has been stopped. Adjustment operations typically require the use of hand tools in order to modify the location at which mounting members secure individual earth working components to the tool bar or the like of the tillage implement or machinery. Because such adjustment operations are time-consuming and inconvenient, a typical farmer or agricultural worker will make adjustments only when extremely unsatisfactory conditions develop.

As a result, it is often the case that operational efficiency and economic considerations are ignored or are given a low priority. These considerations include fuel conservation as well as other conditions such as penetration beneath the hard soil pan whenever permitted by soil and weather conditions. Accordingly, there is a need for soil working implements of the type discussed herein which have the ability to accomplish independent adjustment of soil working tools, which adjustment can be carried out easily and preferably from a remote location such as from the cab of a tractor or the like. Even more advantageous properties would be provided by a mechanism that would allow adjustment even while the tillage machinery is in operation moving through a field.

In some cases, the needed adjustment is very difficult to accomplish because the adjusting and mounting components are located within the framework of the implement that supports the components of the machinery. Also, most multiple component tillage equipment currently in use is structured in a manner such that the working depth of a deep tillage component cannot be changed without also changing or in some manner affecting the adjustments of other soil working components that have already been made. The task of properly adjusting each component in a single pass/multiple component unit is especially complicated when a deep tillage component is used integrally with soil finishing tools which are relatively shallow working components. While relatively shallow working components typically do not require extensive adjustment when terrain, soil and weather conditions change, conditions such as slope of the land, moisture content of the soil and composition of the soil will affect the ability of the towing or propelling vehicle to pull the tool having a deep operating profile or a high draft requirement through the soil. Efficiency of operation can be enhanced if the depth of penetration of the high draft tool can be easily varied when these soil conditions change. For example, if an uphill incline in terrain is encountered, it will typically be desirable to reduce the depth of soil penetration of the high draft tool in order to generally offset the increased power needed to propel the implement and vehicle up the slope. The need to decrease depth may also occur when a section of unusually compacted or sticky soil is encountered, or when the propelling vehicle passes through a wet area which reduces traction to the point of causing tire slippage when the high draft tool is operating under deep penetration conditions.

By the same token, one of the important objectives of subsoiler implements having a high draft capability is to break up the plow pan or hard soil pan, which is a generally impervious compacted layer of soil that inhibits root penetration through it and into the moist, looser soil therebelow. This plow pan or hard soil layer is generally found between 8 and 14 inches below the soil surface, and thus the desired working depth needed to break up the plow pan may vary between roughly 10 to 16 inches, depending upon the particular depth of the plow pan. Accordingly, even when slope, soil and weather conditions remain substantially constant, it is at times desirable to adjust the working depth of the subsoiler components in order to track plow pan variations.

With a typical multiple component device having subsoiling capabilities, most operators do not often bother to adjust the components depending upon variations in conditions and plow pan depths. Instead, the farmer or agricultural worker typically adjusts the unit at the beginning of a run based upon the conditions present at the location of the run or that are anticipated will be encountered during the run. Often, this adjustment requires an approximation of the average type of conditions which will be encountered during the run, based upon the experience of the farmer. This estimate of average conditions usually involves selecting a compromise between the desired depth of tool penetration and the power needed to propel the machinery under anticipated conditions of soil, slope and moisture. This type of compromise can result in a situation in which the plow pan is not adequately dealt with at some stages of the earth working operation while excessive power is used at other stages.

These types of problems are avoided by the present invention, which includes a tillage implement having an independent depth control mechanism for controlling the working depth of one of a plurality of soil working components independently of the working depth to which at least one other soil working component is set or adjusted. The controlling mechanism varies the depth of a soil working tool having a high draft requirement, and its operation does not affect the working depth of other earth working components. It is accordingly possible to adjust the working depth of the deep tillage component without significantly modifying or disrupting the surface soil profile that is formed by the tillage implement. In addition, the working depth controlling mechanism is arranged so as to be combined with a mechanism for permitting its soil working tool to float and/or trip when it engages an obstacle.

It is accordingly a general object of the present invention to provide an improved tillage implement having an independent depth control mechanism.

Another object of this invention is to provide an improved tillage implement which permits the farmer or agricultural worker to adjust the working depth of high draft components without significantly affecting the seed bed profile or surface soil profile that is formed by the implement.

Another object of this invention is an improved tillage implement which includes depth control capabilities that can be carried out while the implement is being operated to till a field.

Another object of the present invention is to provide an improved tillage implement which has means to quickly set the desired maximum working depth of a deep tillage component without the time-consuming task of readjusting all of the components in a multi-component tillage tool.

Another object of this invention is to provide an improved tillage implement which achieves enhanced efficiency of operation and fuel conservation, while also maximizing penetration of the hard, impervious plow pan layer that is present in many fields, especially those that have been worked with machinery for a number of years.

Another object of the present invention is to provide a tillage implement that has a deep tillage component which can float or trip over subterranean obstacles while allowing for a change in working depth of the deep tillage component.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is a perspective view of a typical tillage implement incorporating the features of the present invention;

FIG. 2 is a side elevational view of a portion of the implement illustrated in FIG. 1 and showing a deep tillage component at a depth below the plow pan of a field;

FIG. 3 is a view similar to FIG. 2 illustrating the deep tillage component in a relatively shallow draft orientation;

FIG. 4 is a view similar to FIG. 3, but also illustrating the deep tillage component floating over a subterranean obstacle;

FIG. 5 is a view similar to FIG. 2, while also illustrating a tripping and resetting function;

FIG. 6 is a top plan view generally along the line 6—6 of FIG. 2; and

FIG. 7 is a rear elevational view generally along the line 7—7 of FIG. 2.

DESCRIPTION OF THE PARTICULAR EMBODIMENTS

With particular reference to FIG. 1, a tillage implement, generally designated as 21, is shown. The implement 21, which includes a toolbar 22, may further include a main frame 23 to which the toolbar 22 is secured, as well as a lift assist frame and wheel assembly 24. A suitable three-point hitch (not shown) is provided for securing this particular implement to a tractor or other mobile power source (not shown).

Tillage implement 21 is a multi-component implement that includes a deep tillage assembly, generally designated as 25, and a number of shallow tillage components positioned generally between a gauge wheel assembly 26 and the rear wheel assembly 24. Included in the illustrated shallow draft or surface soil working components are a forward coulter or disc assembly 27 which provides initial break-up of soil and foliage such as crop residue from the previous season's planting, a so-called heave limiter assembly 28 that is useful in breaking up or crushing soil clods that are raised by the deep tillage assembly 25, such being particularly useful for heavy soils. Also illustrated is an assembly 29 including fluted coulters, as well as a rear seed bed preparation assembly 31 which typically includes rotating devices such as the illustrated rolling baskets. A planting apparatus (not shown) of known construction can be mounted to the rear of the implement 21 when it desired to accomplish tillage and planting operations during a single pass.

Each of the shallow or surface soil working components is mounted to the toolbar 22 by suitable mounting members (not shown) that can permit adjustment of the working height of each such shallow or surface soil working components. Mounting and operating details of the deep tillage assembly 25 are illustrated in FIGS. 2 through 7. The deep tillage assembly 25 that is illustrated in these drawings is one which includes a subsoiler shank 32 having a subsoiler point 33. An objective of this assembly is to have the subsoiler point 33 travel beneath the compaction layer or hard pan of the soil 34 beneath the ground level 35, as is generally illustrated in FIG. 5.

The subsoiler shank 32 is secured to the toolbar 22 through a so called four-bar linkage assembly 36. Such securement can include the use of a shank toolbar clamp 37 generally supporting a stop 38. The illustrated four-bar linkage assembly, which is of a generally known construction, provides the ability for the subsoiler shank 32 to float when minor subterranean obstacles are encountered and to trip when more substantial subterranean obstacles are engaged. The illustrated linkage assembly 36 further includes the known feature of automatically resetting the linkage assembly 36 after same has been tripped, as will be more fully discussed hereinafter.

With more particular reference to the illustrated four-bar linkage assembly 36, same includes a lower pivot arm 39 and a toggle assembly including a rear toggle link arm 41, both of which are pivotally secured to a shank holder 42 which is generally elongated as shown in order to provide, in effect, one side of the four-bar linkage assembly 36. The fourth side thereof is provided by spaced pivot mounting of the front end of the lower pivot arm 39 and the front end of the toggle assembly to the assembly of the toolbar 22 and the shank toolbar clamp 37. This four-bar linkage assembly 36 permits a certain amount of floating movement of the subsoiler shank 32 in a generally upward and downward manner when the tillage implement 21 moves across a field, such movement being responsive to minor terrain variations and engagement with relatively small obstacles, such as is generally illustrated in FIG. 4. The particular four-bar linkage assembly 36 that is illustrated will also trip and reset in accordance with generally known principles, and as illustrated in FIG. 5.

The independent depth control mechanism, generally designated as 43, includes an elongated rotatably mounted bar, such as the illustrated rock shaft tube 44. A linear actuator 45, such as the illustrated piston assembly, is mounted between the rock shaft tube 44 and the assembly of the toolbar 22 in order to rotate the rock shaft tube 44 with respect to the non-rotatable tool bar 22. The linear actuator 45 is provided in order to impart rotative movement to the rock shaft tube 44 in response to actuation thereof by the farmer or agricultural worker, such as by the movement of a lever or the pushing of a button which imparts linear movement to the linear actuator 45. In the illustration in the drawings, a hydraulic line 46 extends to a control member that is conveniently located, for example within the cab of a tractor.

In the embodiment illustrated in the drawings, the linear actuator 45 is mounted to the toolbar 22 by means of an extending bracket 47 which is secured to the assembly including toolbar 22 by suitable means such as the illustrated bolts 48. The other end of the linear actuator 45 is secured to an upstanding lug 49, which is rigidly mounted to the rock shaft tube 44. In the illustrated structure, an arm 51 is interposed between the upstanding lug 49 and one end of the linear actuator 45. The linear actuator 45 is pivotally mounted at one end to the arm 51 and at its other end to the extending bracket 47 in order to thereby accommodate changes in angular relationships at these mounting points when the linear actuator 45 is extended or retracted.

A lift lug 52 is mounted along the rock shaft tube 44 at each location at which a deep tillage assembly 25 is positioned, as is illustrated in FIGS. 6 and 7. With this arrangement, when the linear actuator 45 is extended, the rock shaft tube 44 and each lift lug 5 will rotate in a counterclockwise direction as viewed in FIGS. 2 through 5, while a reduction in the length of the linear actuator 45 will result in clockwise movement of the rock shaft tube 44 and each of its lift lugs 52.

Each lift lug 52 is secured to an accommodation member or assembly that allows the herein described floating and tripping action while at the same time providing some fixed length in order to control the maximum desired working depth selected. Such accommodation member or assembly can include a chain, a cable, a bar having one or more slots, or the like. Slotted bars 53 having two slots are illustrated in the drawings.

With respect to illustrated slotted bars 53, each is pivotally secured to one of the lift lugs 52 through a slot in the bar 53, in this case, an upper slot 54. A lower slot 55 of each slotted bar 53 is pivotally secured to the deep tillage assembly 25, and more specifically to the four-bar linkage assembly 36 thereof. Accordingly, in the orientation illustrated in FIG. 2, the subsoiler shank 32 is in its deep tillage or high draft orientation, which is typically one in which the subsoiler point 33 is at or below the compacted layer or hard pan 34 of the soil. In this orientation that is illustrated in FIG. 2, the mounting between the lift lug 52 and the linkage assembly 36 is shown at its extended orientation. In the illustrated embodiment, this extended orientation is provided at the outwardmost locations of the slots 54 and 55. FIG. 2 shows an orientation wherein the subsoiler shank 32 is not floating above the penetration depth set by the linear actuator 45.

An illustration of such floating action is found in FIG. 4. The subsoiler point 33, which has engaged a small obstacle 56, has moved upwardly, and the linkage assembly 36 has flexed but has not tripped. In the illustrated embodiment, this flexing is accommodated at least in part by the slots 54 and 55 which permit linear movement of pivot points in order to vary the operative length of the slotted bar 53 to a length shorter than the extended orientation shown in FIG. 2. The accommodation member or assembly also provides accommodation for movement of the components of the linkage assembly 36 when it is tripped to the orientation shown in FIG. 5.

With more particular reference to the operation of the independent depth control mechanism, the working depth of the subsoiler point 33 is easily adjusted, even during field-tilling operation of the tillage implement 21, by extending the linear actuator 45, thereby rotating the rock shaft tube 44 and each of its lifting lugs 52 in order to thereby lift the slotted bar 53 and the linkage assembly 36 to an orientation such as the one shown in FIG. 3, which results in raising the subsoiler point 33 to the working depth shown in FIG. 3. At the FIG. 3 working depth, the subsoiler shank 32 is allowed to float along the lines of that shown in FIG. 4 or to trip along the lines of that shown in FIG. 5. In other words, the linkage assembly 36 continues to operate throughout various working depths of the subsoiler shank 32.

During the operation of the tillage implement 21, it is often desirable to set the device to a maximum working depth. More particularly, once the farmer or agricultural worker has determined what the maximum working depth should be for a particular field, means can be provided in order to fix that maximum working depth by providing adjustable means for limiting the travel of the linear actuator 45. Two such means are illustrated. One of them involves positioning a slit collar 57 around an extending rod 60 when the linear actuator 45 is a piston and cylinder assembly. Different maximum working depths are set by varying the number or height of such split collars 57. This arrangement is illustrated in FIGS. 2 and 3. The other illustrated means for fixing the maximum working depth of the subsoiler shanks 32 is illustrated in FIGS. 4 and 5. A plurality of depth adjusting holes 58 are provided within a mounting plate 59, and a pin 61 can be inserted through one or more of the depth adjusting holes 58 in order to stop clockwise movement of the lift lugs 52 beyond a desired location.

With more particular reference to the illustrated four-bar linkage assembly 36, the independent depth control mechanism 43 is designed so as to be used in combination with a linkage assembly that allows the subterranean point 33 to float or to trip over subterranean obstacles irrespective of the depth at which the subsoiler point 33 is set by the independent depth control mechanism. Such four-bar linkage assembly 36 can also include an automatic reset mechanism 62 of type generally illustrated in the drawings. The cooperative interaction between the independent depth control mechanism 43 and the four-bar linkage assembly 36 is illustrated by the various cooperative positions shown in FIGS. 2, 3, 4 and 5.

In FIG. 2, the independent depth control mechanism 43 is set to a substantially deep position, and the four-bar linkage assembly 36 is in a generally downwardly oriented position such that the lower pivot arm 39 and the rear toggle link arm 41 are generally downwardly oriented. FIG. 3 illustrates slight generally upward movement of the lower pivot arm 39 and of the rear toggle link arm 41 in response to extension of the linear actuator 45 which exerts a generally upwardly directed pulling force on a pivot pin 64 of the lower pivot arm 39. Even at this orientation, the subsoiler shank 32 can float due to the flexing function that is provided by the linkage assembly 36 associated with pivotability provided by pivotal mounts including toggle link rear pivot 65, toggle link front pivot 66, lower pivot arm rear pivot 67, and lower pivot arm front pivot 68. Additional bendability can be provided by providing a toggle assembly including a toggle link center pivot 69 in order to form a bendable joint between the rear toggle link arm 41 and a forward toggle link arm 71.

When an object such as a subterranean obstacle is encountered which requires compensation greater than the floating function illustrated in FIG. 4, the illustrated four-bar linkage assembly 36 will automatically trip to the orientation shown in FIG. 5. The lower pivot arm 39 is extended to its upwardmost position, which is defined by engagement of an edge thereof with an upper stop 72. In addition, the rear toggle link arm 41 and the forward toggle link arm 71 buckle with respect to each other in order to thereby permit completion of upward movement of the subsoiler point 33 to above the ground level 35. This movement of the subsoiler point 33 is illustrated by movement from point A to point B as shown in FIG. 5. In accordance with generally known principles, and when the linkage assembly 36 includes an automatic resetting feature, a spring assembly 73 exerts a generally downwardly directed force onto the link 63 in order to thereby move the subsoiler point 33 along the path between points B and C that is illustrated in FIG. 5. Continued movement of the tillage implement 21 in a forward direction results in downward movement of the subsoiler point 33 from location C back to the preset working depth of the independent depth control mechanism 43.

It will be understood that the embodiments of the present invention which have been described are illustrative of some of the applications of the principles of the present invention. Numerous modifications may be made by those skilled in the art without departing from the true spirit and scope of the invention.

I claim:

1. An improved tillage implement having a plurality of soil working components and means for mounting each soil working component onto the tillage implement, the improvement comprising:

one of said soil working components is a deep tillage assembly having a high draft requirement, said deep tillage component assembly being mounted to the tillage implement by way of linkage means for permitting movement of the deep tillage component assembly with respect to the rest of the tillage implement;

means for independently controlling the depth of soil penetration effected by said deep tillage component assembly, said independent depth controlling means operating independently of any soil working component other than said deep tillage component assembly, and said independent depth controlling means is operatively connected to said deep tillage component assembly, whereby operation of said independent depth controlling means raises or lowers said deep tillage component assembly thereby varying the working depth of the deep tillage component assembly; and said independent depth controlling means is operable while the tillage implement is moving through a field.

2. The tillage implement according to claim 1, wherein at least one of said other soil working components is a surface soil tillage tool which is secured to the tillage implement by mounting members other than said independent depth controlling means.

3. The tillage implement according to claim 1, wherein said independent depth controlling means is adapted to modify the working depth of the deep tillage component assembly without significantly modifying or disrupting operation and depth of operation of said other soil working components.

4. The tillage implement according to claim 1, wherein said linkage means for permitting movement of the deep tillage component assembly includes means for permitting floating and tripping of the deep tillage component assembly.

5. The tillage implement according to claim 1, wherein said linkage means is a four-bar linkage assembly.

6. The tillage implement according to claim 1, wherein said other soil working components are surface soil working components including one or more of coulters, discs, heave limiters and rear seed bed preparation assemblies.

7. The tillage implement according to claim 1, wherein said deep tillage assembly includes a subsoiler shank having a subsoiler point.

8. The tillage implement according to claim 1, further including means for setting a maximum working depth of said deep tillage component assembly.

9. A tillage implement having a plurality of soil working components and means for mounting each soil working component onto the tillage implement, comprising:

one of said soil working components is a deep tillage assembly having a high draft requirement, said deep tillage component assembly being mounted to the tillage implement by way of linkage means for permitting movement of the deep tillage component assembly with respect to the rest of the tillage implement;

means for independently controlling the depth of soil penetration effected by said deep tillage component assembly, said independent depth controlling means operating independently of any soil working component other than said deep tillage component assembly, and said independent depth controlling means being in operative relationship with said linkage assembly;

said linkage means for permitting movement of the deep tillage component assembly includes means for permitting floating and tripping of the deep tillage component assembly; and said linkage means further includes means for automatically resetting same after tripping thereof.

10. A tillage implement having a plurality of soil working components and means for mounting each soil working component onto the tillage implement, comprising:

one of said soil working components is a deep tillage assembly having a high draft requirement, said deep tillage component assembly being mounted to the tillage implement by way of linkage means for permitting movement of the deep tillage component assembly with respect to the rest of the tillage implement;

means for independently controlling the depth of soil penetration effected by said deep tillage component assembly, said independent depth controlling means operating independently of any soil working component other than said deep tillage component assembly, and said independent depth controlling means being in operative relationship with said linkage assembly; and said independent depth controlling means includes an elongated bar that is rotatably mounted in a transverse orientation onto said tillage implement, means for rotating said elongated bar, and means for connecting said elongated bar to said deep tillage component assembly.

11. The tillage implement according to claim 10, wherein said bar rotating means includes a remotely controlled linear actuator.

12. The tillage implement according to claim 10, wherein said bar rotating means is positioned between a toolbar assembly of the tillage implement and an upstanding lug that is secured to said elongated bar.

13. The tillage implement according to claim 12, wherein said bar rotating means includes a remotely controlled linear actuator which is a piston and cylinder assembly.

14. The tillage implement according to ciaim 10, wherein said connecting means includes bar means joining an extension of said rotatable elongated bar to said linkage means, said bar means permitting variation in the operative length thereof.

15. A tillage implement having a plurality of soil working components and means for mounting each soil working component into the tillage implement, comprising:

one of said soil working components is a deep tillage assembly having a high draft requirement, said deep tillage component assembly being mounted to the tillage implement by way of linkage means for permitting movement of the deep tillage component assembly with respect to the rest of the tillage implement;

means for independently controlling the depth of soil penetration effected by said deep tillage component assembly, said independent depth controlling means operating independently of any soil working component other than said deep tillage component assembly, and said independent depth controlling means being in operative relationship with said linkage assembly; and said linkage means includes toggle means that collapses generally on itself for tripping said linkage means and that is movable to an uncollapsed state for resetting said linkage means.

16. A tillage implement comprising:

a plurality of soil working components, including a deep tillage working component and a surface soil working component and means for mounting each soil working component onto the tillage implement;

said deep tillage working component being an assembly having a draft requirement, said deep tillage component assembly being mounted to the tillage implement by way of linkage means for permitting movement of the deep tillage component assembly with respect to the rest of the tillage component;

means for independently controlling the depth of soil penetration effected by said deep tillage component assembly, said independent depth controlling means operating independently of said surface soil working component, said independent depth control means being in operative relationship with said linkage assembly;

said independent depth controlling means includes an elongated bar that is rotatably mounted in a transverse orientation onto said tillage implement, a linear actuator for rotating said elongated bar, and means for connnecting said elongated bar to said deep tillage component assembly.

17. The tillage implement according to claim 16, wherein said linear actuator is positioned between a toolbar assembly of the tillage implement and an upstanding lug that is secured to said elongated bar.

18. The tillage implement according to claim 16, wherein said connecting means includes bar means joining an extension of said rotatable elongated bar to said linkage means, said bar means permitting variation in the operative length thereof.

19. The tillage implement according to claim 16, further including means for setting a maximum working depth of said deep tillage component assembly.

* * * * *